United States Patent [19]

Kohl et al.

[11] 4,101,027

[45] Jul. 18, 1978

[54] MAGAZINE FOR A PLURALITY OF RECORDING MEDIA

[75] Inventors: Lambert Kohl, Wachenheim; Richard Schneider, Heidelberg-Neuenheim; Karl Uhl, Frankenthal, all of Fed. Rep. of Germany

[73] Assignee: BASF Aktiengesellschaft, Ludwigshafen, Fed. Rep. of Germany

[21] Appl. No.: 717,405

[22] Filed: Aug. 24, 1976

[30] Foreign Application Priority Data

Mar. 26, 1976 [DE] Fed. Rep. of Germany ....... 2612854

[51] Int. Cl.² .................... G11B 5/48; B65D 85/30
[52] U.S. Cl. ................................. 206/309; 206/387; 206/444; 206/455; 220/94 A; 220/324; 360/98; 360/133
[58] Field of Search ............... 206/309, 307, 387, 444, 206/818, 455, 456; 220/318, 324, 326, 94 A; 360/132, 98, 133; 40/79; 346/137

[56] References Cited

U.S. PATENT DOCUMENTS

| | | | |
|---|---|---|---|
| 2,368,918 | 2/1945 | Esterow | 220/324 |
| 2,712,394 | 7/1955 | Koschatzky et al. | 220/324 |
| 2,774,472 | 12/1956 | Badalich | 206/456 |
| 3,053,433 | 9/1962 | Wall | 206/818 |
| 3,175,853 | 3/1965 | Gilbertson | 220/326 |
| 3,552,549 | 1/1971 | Creese et al. | 220/318 |
| 3,973,273 | 8/1976 | Lissner et al. | 360/133 |

FOREIGN PATENT DOCUMENTS 6,613,821 4/1968 Netherlands ............... 206/455

Primary Examiner—William Price
Assistant Examiner—Joseph Man-Fu Moy
Attorney, Agent, or Firm—Keil, Thompson & Shurtleff

[57] ABSTRACT

A magazine for transport and operation in a device for a plurality of film-like flat recording media, especially of floppy disks. Details of the magazine according to the invention relate to a part which receives the recording medium, a lid, a mechanism for locking the said parts together, and a guide and gripper part.

5 Claims, 6 Drawing Figures

MAGAZINE FOR A PLURALITY OF RECORDING MEDIA

The invention relates to a magazine for transporting a plurality of recording media and for operation in a device for the recording and/or playback of information, especially a plurality of magnetic films, in flat rectangular containers, for write and/or read operation.

A magazine for storing stacked data cards, especially punched cards, is disclosed in German Published Application DAS No. 21 19 418. This magazine possesses cut-outs at the bottom and can be mounted on a card transport, and transport rolls pass through the recesses, as far as the lowest card, and push the latter out of a discharge aperture, at the bottom of one side of the magazine, into the device; after passing through the device, the card can be returned through an insert aperture at the top of the opposite side of the magazine and falls into the magazine, onto the stack of cards lying flat on the bottom of the said magazine. On its top face, the magazine has a grip to permit handling.

In the conventional magazine, the recording media, once they have been fed into the magazine in a particular sequence, can only be removed as a series, in the same sequence, and can only be used in the device in the same way. Furthermore, the magazine is not stackable and, because of its shape, is expensive to manufacture.

Projection mechanisms for transparencies have furthermore been disclosed, in which the transparencies are available, in magazines, to the mechanisms for automatic projection as a series. Such a projection mechanism and magazine for the said mechanism is disclosed, e.g., in German Utility Model No. 75 16 360. On its underside, the magazine is provided with lengthwise grooves and crosswise cut-outs, by means of which a stepwise motion, in the lengthwise direction, on the corresponding transport mechanism of the projection mechanism is made possible. The magazines can be used for filing purposes if a lid seals the magazine and the transparencies, contained therein, from the outside. The magazine and device are specifically constructed for transparencies and cannot be employed directly for other types of recording media, e.g. for flexible magnetic films in flat protective sleeves.

It is an object of the present invention to provide a magazine and device for the transport and operation of a plurality of recording media, especially of magnetic films in sleeves, by means of which an advantageous method of operation is achievable, not only in series in a predetermined sequence of the recording media, and by means of which improved handling and improved protection of the recording media is also achievable, whilst the design is simple and the process of manufacture is inexpensive.

We have found that this object is achieved by a magazine and device for the transport and operation of a plurality of recording media for recording and/or playback of information, especially of magnetic films in flat sleeve-like containers, for write and/or read operation, if the magazine has an essentially cuboid receiver part with a plurality of compartments for the recording media, with a lid for sealing off the recording media contained in the receiver part, a releasable locking mechanism between the receiver part and the lid, a guide part connected to the receiver part and a carriage part, provided on the device and constructed so as to engage with the guide part.

Such a construction of the magazine and device, in which the magazine can only be used on the device according to the invention or, more precisely, on the transport mechanism of the device, can be used with advantage for any recording media, especially those which require good protection against dust and need to be accessible non-serially.

In a further advantageous embodiment of the invention, the receiver part can possess an approximately rectangular element, fixed externally to the bottom, of which the horizontal part of the angle forms the guide part whilst the vertical part of the angle forms a grip for the receiver part. This permits very advantageous manufacture of the magazine.

In order to achieve simple filing of several magazines, the lid can, according to the invention, be constructed as a hollow cuboid open on one side, and having a gripper recess molded into one wall.

According to the invention, the locking mechanism can advantageously consist of a hook-like extension on the grip of the receiver part and an aperture or recess in the wall of the lid adjacent to the grip. This achieves very trouble-free locking of the receiver part to the lid, and permits very simple and inexpensive manufacture.

In a further advantageous embodiment according to the invention, the magazine according to the invention can be so constructed that the wall which is opposite the wall adjoining the grip possesses a support-like extension, delimiting the open side of the lid, for the receiver part, on which the receiver part rests after engaging the hook-like extension in the aperture or recess of the lid. This results in a constructionally very advantageous locking mechanism.

The device on which the magazine is used can, according to the invention, advantageously be so constructed that the carriage part is supported on slide bars, enabling it to move lengthwise, and possesses a guide groove for engagement of the guide part on the magazine side. This solves, without additional means, the problem of a construction which permits simple and precise movement or positioning of the magazine.

According to the invention, in yet a further embodiment of the magazine and device, a magnetizable body is provided at the front of the guide part on the magazine side and a magnetic component for detachable coupling to the said body is provided in the front part of the guide groove on the carriage on the device side.

Details of an embodiment, according to the invention, of a magazine and device are described below, and shown in the drawing.

In the drawing:

FIG. 5a shows a side view of a magazine before it is fitted onto the device and FIG. 5b shows a plan view of the arrangement in FIG. 5a.

A change-over magazine 1 is constructed as a transport container and protective container for any predetermined number of recording media 12, in the present instance of floppy disks or flexible disk cartridges. The change-over magazine is intended for a correspondingly constructed recording and/or playback device and, as may be seen from the text which follows, is suitably constructed for this purpose. In the device, the individual recording media 12 can be taken from the magazine 1 for recording and/or playback or for writing and/or reading signals, and can be returned into the magazine. Corresponding withdrawing mechanisms are, however, not described here and form no part of the present invention.

Figure 1:
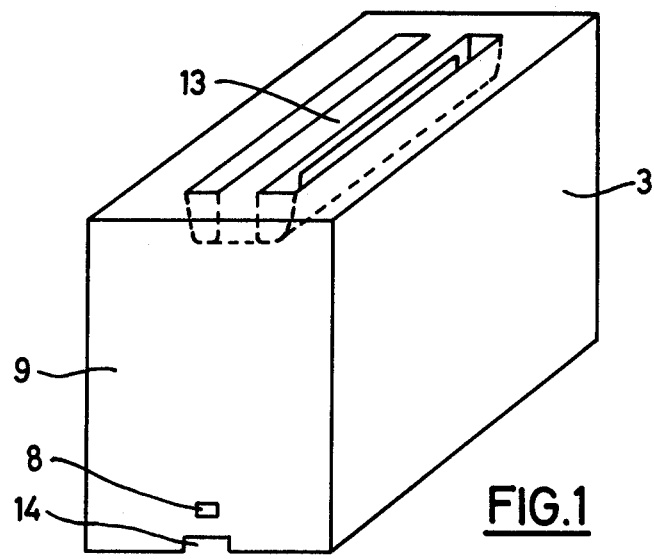
FIG. 1 shows the lid of a magazine according to the invention.
Figure 2:
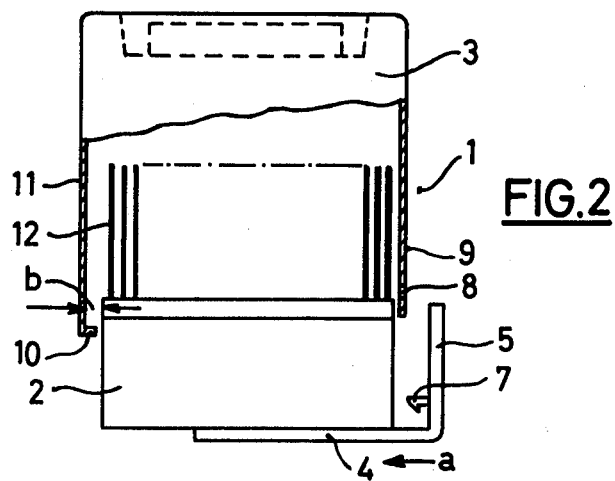
FIG. 2 shows a magazine with its receiver part and with the lid not yet fully fitted.

The magazine consists of the receiver part 2 with compartments for the recording media 12, and a lid 3, constructed as a hood, which fits over the receiver part 2 and seals the lower part, containing the recording media, from the exterior so as to protect them from dirt, dust and damage. The receiver part 2 carries an angle-piece, one arm of which, 4, is fixed to the bottom of the part 2, whilst the other arm, 5, at right angles to the first arm, extends vertically upward, parallel to and at a distance from a side wall of the receiver part 2, and thus forms a grip for the receiver part 2. Since the arm 4 of the angle is intended as a guide part for the receiver part 2, and the arm 5 of the angle is provided with a locking hook 7 for engaging in an aperture or recess 8 in the adjacent side wall 9 of the lid 3 when the latter is placed in position, the angle-piece serves simultaneously as a guide for the receiver part 2 and as a means of locking together the receiver part 2 and the lid 3. A cut-out 14 on the bottom edge of the wall 9 of the lid 3 permits the lid 3 to be fitted over the arm of the angle 4. As indicated in FIGS. 1 to 3, the lid 3 is provided, on its upper face, with a trough-like molded-in grip 13, which permits easy carrying of the lid 3 of the complete magazine 1, and also convenient and space-saving stacking and filing of the magazines.

Figure 3:
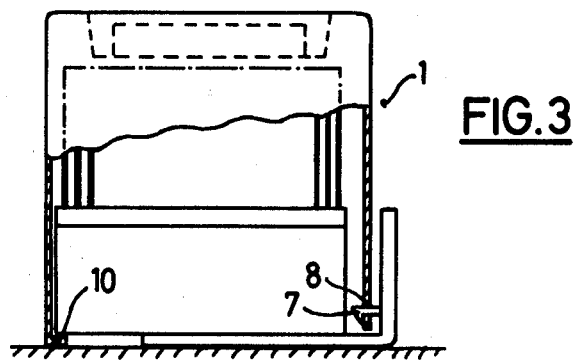
FIG. 3 shows a magazine according to FIGS. 1 and 2, with the lid fully fitted.

As is shown, especially in FIG. 3, the locking of the parts 2 and 3 is achieved not only by the engagement of the hook 7 with the orifice 8 in the wall 9 of the lid 3 but also by seating of the bottom of the receiver part 2 on a support edge 10 on the wall 11, opposite the wall 9, of the lid. The thickness of the support edge 10 should approximately correspond to the thickness of the arm 4 of the angle so that, as indicated in FIG. 2, after fitting the lid, the edge 10 and the arm can sit on one and the same plane. As can be seen from, for example, the successive positions of the receiver part 2 and the lid 3 in the course of the closing sequence (FIGS. 2 and 3), locking is carried out by pushing the receiver part 2 in the direction of the arrow a) after the lid 3 has been completely pushed over the receiver part 2, as a result of which the receiver part 2 is moved a distance b in the direction of the wall 11 and slides over the edge 10, and at the same time the locking catch, provided on the hook 7, is forced to engage in the orifice 8 behind the wall 9. For unlocking, the grip 5 is lifted slightly and pulled in the opposite direction to "a", as a result of which the hook 7 is released and hence the lid 3 can be lifted off.

As will be seen from the text which follows, the guide part can also be constructed as a groove in the bottom of the receiver part 2; this groove is not shown in the drawing. If, in such a case, the locking mechanisms described above are to be retained, the thickness of the support edge 10 must be reduced, for example to that of a thin sheet of metal, so as to enable the magazine 1 to rest, and stand, substantially horizontally, and not skew, on a horizontal plane.

Figure 4:
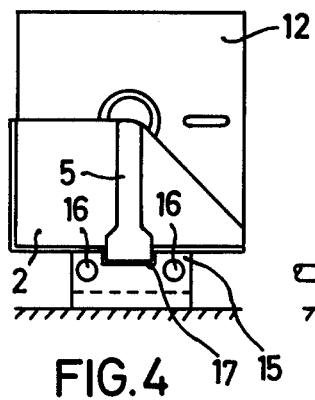
FIG. 4 shows a front elevation of a magazine on a device.
Figure 5A:
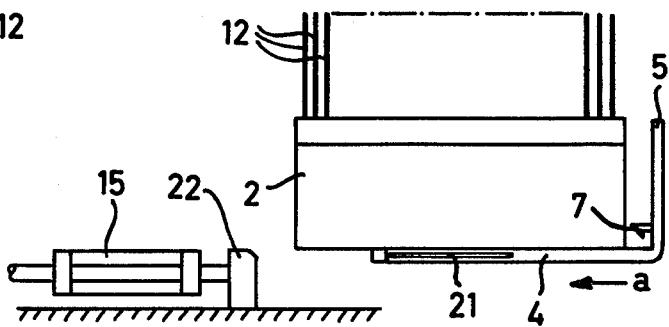
Figure 5B:
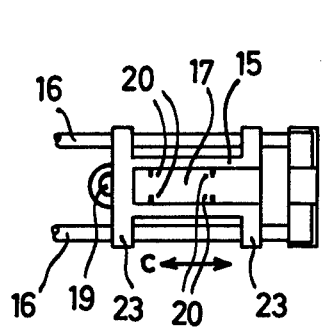
Figure 5B:
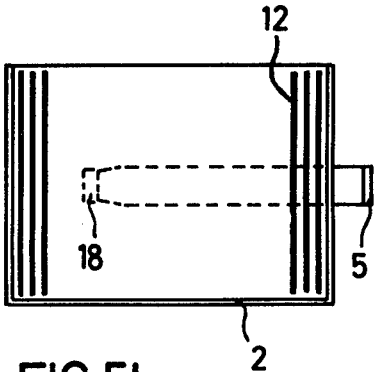

FIGS. 4, 5a and 5b show various embodiments of the device. FIG. 4 shows a receiver part 2 with its grip angle 5 and flexible disk cartridges 12 of the floppy disk system on a carriage 15 of a write/read device for the flexible disk cartridges, the remainder of the device not being shown. A suitable withdrawing mechanism, not described in the present text, enables the diskettes 12 to be withdrawn conveniently in the right-hand side direction from the receiver part 2 shown in FIG. 4. The carriage is mounted on a pair of slide rods 16 to enable it to move at right angles to the plane of the drawing. A guide groove 17 serves to receive the guide part 4 on the receiver part 2. FIG. 5a shows the receiver part 2 with the flexible disk cartridges 12 before engagement with the carriage 15. FIG. 5b shows the arrangement of FIG. 5a, in plan view. In FIG. 5b, a magnetizable body 18 is provided at the top of the guide part 4, which body, after the part 4 has been introduced into the groove 17, interacts with a magnetic component 19 provided at the end of the groove 17 and is attracted thereby, thus facilitating, and reliably terminating, the insertion sequence. The body 18 can be, for example, a magnetizable disk whilst the magnetic component 19 can be an oxide magnet, fixed to the carriage 15 and shown as a semi-circle in the drawing.

Guide pins 20 can be provided laterally in the guide groove 17; these pins, together with lateral slits 21, FIG. 5a, in the guide part 4 serve as a blocking mechanism which prevents the receiver part 2 of the magazine, which part has been inserted into the carriage 15 of the device, from being withdrawn. The slide rods 16 mentioned above are mounted in bearing blocks 22. Slide bushes 23 for the slide rods 16 are provided on the carriage 15. The possible directions of motion of the carriage 15 are indicated by the double arrow c.

The design which has been described for the magazine and device has proved very advantageous in practical use. Of course, further possible embodiments will suggest themselves to those skilled in the art and also fall within the ambit of the claims. All the parts, described above, of the magazine 1 and of the device can be manufactured from suitable materials of construction, e.g. plastics, by injection molding, by compression molding or by other suitable methods of manufacture. The carriage should be manufactured from a suitable metal, e.g. steel or a metal alloy, or from glass fiber-reinforced plastic.

We claim:

1. A storage magazine for use in a record-changing device for recording and/or playing back information on a selected one of a plurality of flexible magnetic recording disks individually housed in respective ones of a plurality of flat rectangular cartridges, said device having a carriage supported therein for movement between a loading position and an operative, cartridge withdrawal position;

said storage magazine comprising:

a substantially cuboid tray with compartments receiving said plurality of cartridges, a removable hood cooperating with said tray to protect the cartridges therein while in storage, and a releasable locking mechanism between said tray and said hood, said tray having guide means for loading said tray with said cartridges therein, and with said hood removed, onto said carriage preparatory to selective withdrawal of said cartridges in said operative position of the carriage, the bottom of said tray having externally attached thereto a substantially L-shaped member, the horizontal arm of said member forming said guide means while the verticle arm of said member extends in spaced relation to the corresponding side wall of the tray to form a handle for laterally moving said tray.

2. A magazine as claimed in claim 1, wherein said hood is in the form of a hollow cuboid which is open at one end and has a grip molded into the wall at the opposite end.

3. A magazine as claimed in claim 1, wherein said locking mechanism includes a hook-like extension on the handle of said tray and a recess in the wall of said hood which is adjacent to said handle, such that said locking mechanism becomes effective when said handle is laterally moved toward said adjacent wall in the hood and is released when said handle is lifted slightly and laterally moved away from the last-mentioned wall.

4. A magazine as claimed in claim 3, wherein said locking mechanism further includes a support-like extension of the bottom edge of the wall of said hood which is opposite the wall adjacent said handle, said tray resting on said support-like extension after said hook-like extension, upon the first-mentioned lateral movement of said handle has engaged said recess.

5. A magazine as claimed in claim 1, wherein said carriage includes a guide groove and the guide means of said tray a guide member shaped to cooperate with said guide groove; and wherein a magnetizable element is provided at the front end of said guide means and a magnetic component at the front end of said guide groove for detachably holding said tray on said carriage in fully inserted condition.

* * * * *